METHOD OF MAKING AN ELECTRICAL TERMINAL BOARD
Filed June 6, 1960 2 Sheets-Sheet 1
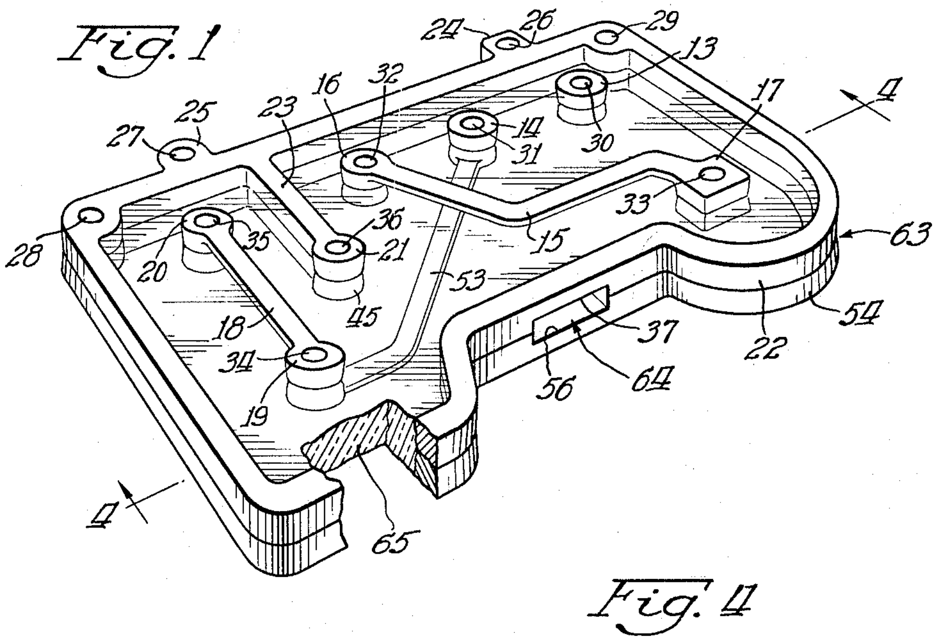
Fig. 4
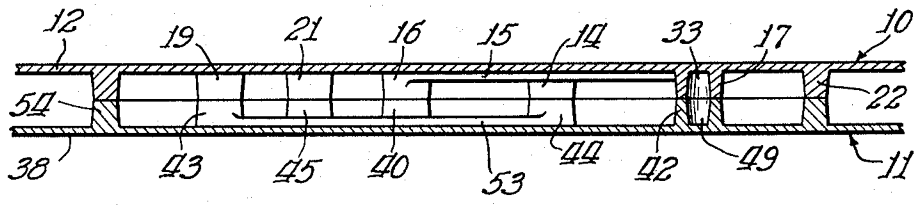
Fig. 5
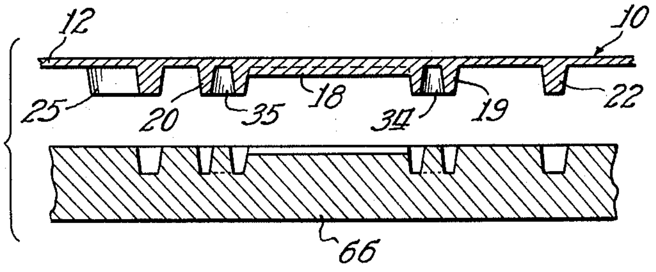
Inventor:
Temple Nieter
By: F. A. Kunmark Atty.

METHOD OF MAKING AN ELECTRICAL TERMINAL BOARD

Inventor:
Temple Nieter
By: F. A. Kruesmark Atty

United States Patent Office 3,158,926

Patented Dec. 1, 1964

3,158,926

METHOD OF MAKING AN ELECTRICAL TERMINAL BOARD

Temple Nieter, Evanston, Ill., assignor to Borg-Warner Corporation, Chicago, Ill., a corporation of Illinois Filed June 6, 1960, Ser. No. 33,974

5 Claims. (Cl. 29—155.5)

This invention relates in general to electrical terminal boards, and more particularly to a method of manufacturing the same mechanically. Methods paralleling my invention, currently in use, which are known as printed circuits, are not entirely satisfactory, particularly because of their inability to carry anything but small currents, acceptably. Other drawbacks of printed circuits are the many stages required in the process of producing them.

My invention comprises the production of an electric terminal board, my mechanical means, composed of metal circuitry for practically any current capacity, and, with respect to the metal circuitry, the introduction of insulation in a liquid state.

It is therefore an object of my invention to provide electrical terminal boards which are produced by repetitious mechanical means.

It is also an object to produce an electrical terminal board comprising an electrically conductive frame encompassing terminals, leads and insulation.

It is another object of my invention to produce an electrical terminal board by providing a pair of complementary conductor portions by any one of the common metal working techniques, each of which portions comprises a metal sheet integral with a ram, conductors and leads, and then joining together these conductor portions at the joining surfaces of the respective rims and conductors to form an integrated electromechanical assembly which becomes its own mold for the reception of the insulator portion in a liquid state.

It is still another object of my invention to provide an improved method of economical manufacture of electrical terminal boards.

My invention consists of the novel constructions, arrangements and devices to be hereinafter described and claimed for carrying out the above stated objects and such other objects as will be apparent from the following description of a preferred manner of exercising the invention, illustrated with reference to the accompanying drawings, wherein:

FIG. 1 is a perspective view of an electrical terminal board produced in accordance with my invention;

Figure 2:
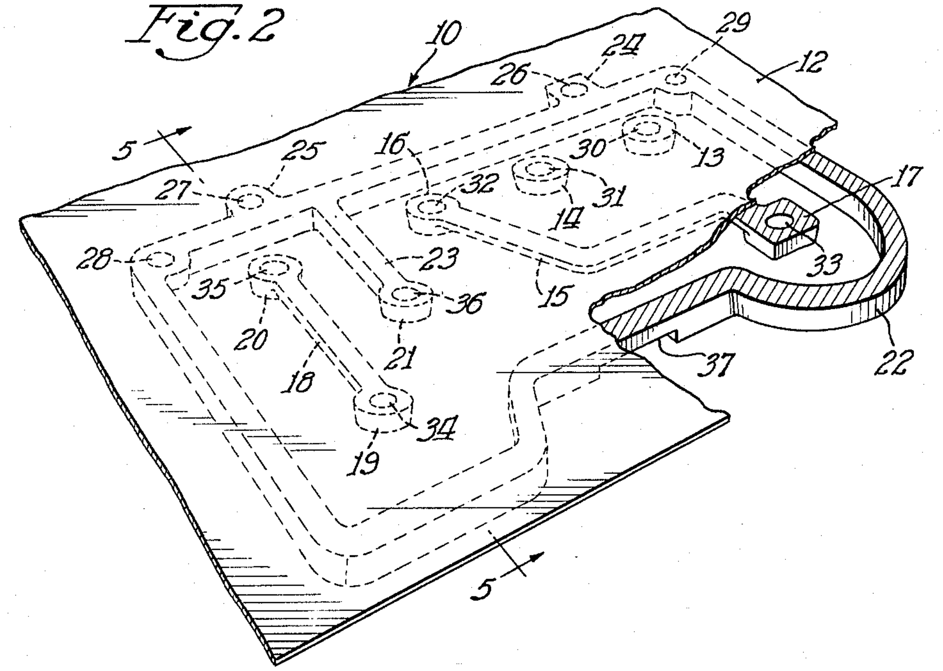
FIG. 2 is a perspective view of a metal sheet assembly showing a fragmentary section of the sheet removed.
Figure 3:
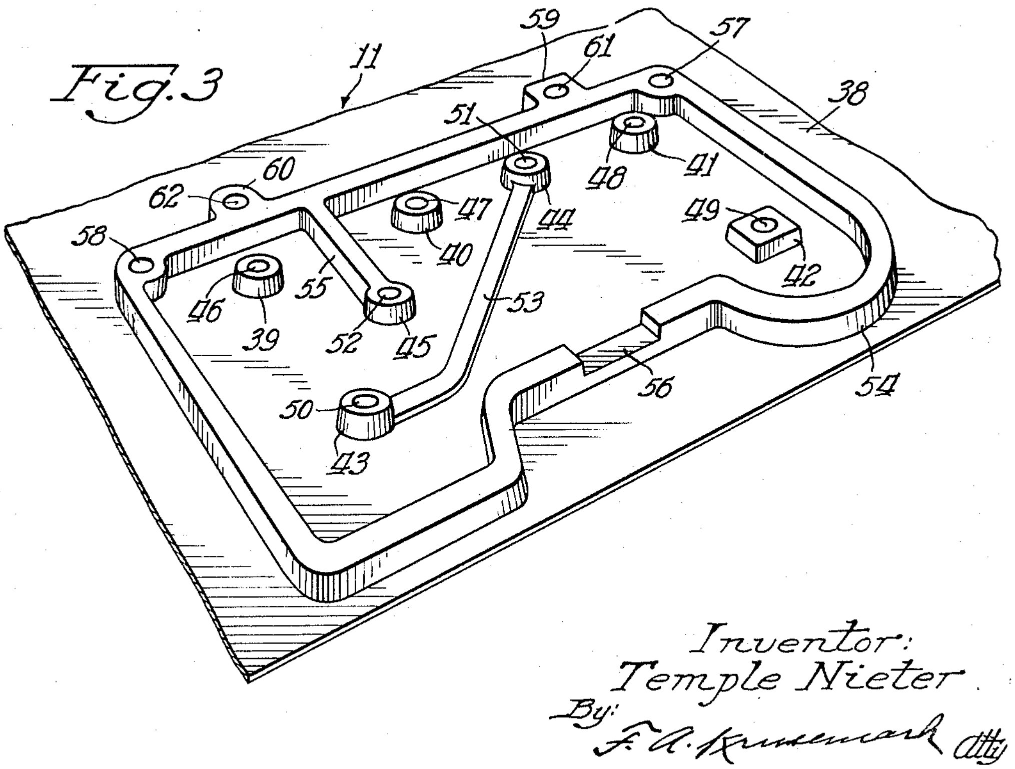
FIG. 3 is a perspective view of a metal sheet assembly which complements the metal sheet assembly shown in FIG. 2.

FIG. 4 is a sectional view taken on line 4—4 of FIG. 1 of the joined metal sheet assemblies shown in FIGS. 2 and 3, after being joined but before removal of metal sheets and filling of cavity with insulation; and FIG. 5 is a view taken on line 5—5 of FIG. 2, and also a corresponding cross-section view of a fragmentary part of a forming die.

Like characters of reference designate like parts in the several views.

The first step in the production of a wiring board, according to my invention, is to provide dies or other commonly used means for forming a pair of metal sheet assemblies 10 and 11 shown in FIGS. 2 and 3, respectively. The metal sheet assembly 10 comprises a metal sheet 12 on which are formed terminals 13 and 14, a lead 15 and terminals 16 and 17 which are interconnected by the lead 15, a lead 18 and terminals 19 and 20 which are interconnected by the lead 18, a terminal 21, a rim 22 and a lead 23 which interconnects the terminal 21 to the rim 22, a pair of laterally extending rim projections 24 and 25 having recesses 26 and 27, respectively, which are of a depth substantially equal to the depth of the rim 22. These projections 24 and 25 having recesses 26 and 27 together with similar projections with recesses that are provided in the companion metal sheet assembly as hereinafter shown, provide holes for mounting purposes after the two assemblies are joined and the metal sheets removed. The rim 22 is provided with a pair of recesses 28 and 29 of a depth substantially that of the rim 22 and the terminals 13, 14, 16, 17, 19, 20 and 21 are provided with recesses 30, 31, 32, 33, 34, 35 and 36 respectively which are also of a depth substantially that of the rim 22. The rim 22 is also provided with a breech 37, the purpose of which will hereinafter become apparent. The rim and terminals are of the same projection distance from the surface plane of the metal sheet.

The metal sheet assembly 11, shown in FIG. 3, is similar to the metal sheet assembly 10 and is also composed of a metal sheet 38 which is integral with all the formed connecting parts which are comparable to those shown integrally with metal sheet 12 and therefore will be numbered and identified only. Comparable terminals 39 and 40, 41, 42, 43, 44 and 45 are shown, which are provided with recesses 46, 47, 48, 49, 50, 51 and 52 respectively. Terminals 43 and 44 are connected by a lead 53, and terminal 45 is connected to a rim 54 by a lead 55. The rim 54 is also provided with a breach 56, recesses 57 and 58 and laterally extending projections 59 and 60 which are provided with recesses 61 and 62 respectively.

In producing my electrical terminal board, the metal sheet assemblies 10 and 11, shown in FIGS. 2 and 3 respectively, are assembled so as to align the rims 22 and 54 at their joining surfaces which thereby also aligns, at their joining surfaces, the terminals 13, 14, 16, 17, 19, 20 and 21 with the terminals 41, 44, 40, 42, 43, 39 and 45 respectively, as shown in FIG. 1. Obviously, the corresponding recesses of the terminals are thereby also aligned as are the recesses 28 and 29 in rim 22 with the recesses 58 and 57 in the rim 54 respectively. Likewise, the laterally extending projections 24 and 25 of rim 22 and laterally extending projections 59 and 60 of rim 54 are also aligned respectively at their joining surfaces, together with the alignment of recesses 26 and 27 with recesses 61 and 62 respectively.

When thus assembled, the joining surfaces of the components as described above are joined by suitable means such as soldering or welding, thereby providing a cavity between the metal sheets 12 and 38 and a frame 63 which is composed of the conjunction of rims 22 and 54. The breaches 37 and 56 of the rims 22 and 54 respectively also fall into alignment in the assembly and provide an opening 64 to be utilized as a means through which liquid insulation may be introduced into the cavity referred to above. Vents, not shown, may be provided to facilitate filling the cavity with liquid insulation.

After the liquid insulation has solidified, the metal sheets 12 and 38 are removed by conventional means such as cutting or grinding, thereby completing the electrical terminal board with insulation 65 which secures and supports the various terminals and leads including those not otherwise supported.

It will be apparent from the drawings that the depth of the various recesses referred to herein is such that when the metal sheets 12 and 38 are removed, these recesses become open holes and that the various recesses in one metal sheet assembly being aligned with recesses in the other metal sheet assembly, openings are thereby provided which extend through the finished electrical terminal board. These openings, as can be seen from the drawings, pass through the various joined terminals, the joined laterally extending projections and the joined rims. These holes now extending through the rim sections or frame 63 and those extending through the joined laterally extending projections are provided for the purpose of securing the electrical terminal board to the device with which it may be used or for any other suitable purpose.

For convenience, the insulation 65 is shown as transparent, whereby a view of the joined terminals may be had. The terminals and rims are tapered which provides draft for removal from the mold or die and also, when joined, provide undercutting at the joining plane which lends itself to firmly locking the insulation to the frame 63 and to the various joined terminals which is readily apparent by viewing FIGS. 1 and 4.

A die fragment 66 of a die, for use in forming the metal sheet assembly 10, is shown in FIG. 5 together with a corresponding view of the metal sheet assembly 10 taken on line 5—5 of FIG. 2. Here, again, the draft provided for the rim and terminals is readily apparent. From the cross-section view of the metal sheet assembly 10, it is apparent that the lead 18 is integral with the metal sheet 12, which, when removed to the level of the various recesses, as heretofore described, leaves a strip of metal, the lead 18, which interconnects the terminals 19 and 20. It will be observed in this connection that the leads 15 and 53 cross each other without touching as is apparent by viewing FIGS. 1 and 4.

I wish it to be understood that my invention is not to be limited to the specific constructions and methods shown and described, except only insofar as the claims may be so limited, as it will be understood to those skilled in the art that changes may be made without departing from the principles of the invention.

I claim:

1. In a method of making an electrical terminal board having mechanically formed connecting parts encompassed by an electrically conductive rim, the steps which comprise; forming a first part having a first metal sheet carrying electrically conductive connecting parts on one of its faces, including a first rim and first terminals; forming a second metal sheet carrying electrical conductive connecting parts on one of its faces, including a second rim and second terminals, the said first rim and first terminals complementing and matching the said second rim and said second terminals, respectively; assembling the said first and second parts in matching alignment with respect to the said rims and the said respective terminals of the said first and second parts; joining the said rims and the said terminals by suitable means such as tinning the surfaces of the parts to be joined and then applying pressure and heat to a degree to effect a union, the joining of the said rims providing a cavity between the said first and second metal sheets; providing an opening into said cavity; introducing hardenable fluid insulation through said opening into said cavity until said cavity is filled with said fluid insulation; allowing said fluid insulation to solidify; and removing said metal sheets which thereby completes said electrical terminal board.

2. In a method of making an electrical terminal board having mechanically formed connecting parts encompassed by an electrically conductive rim, the steps which comprise; forming a first part having a first metal sheet carrying electrically conductive connecting parts on one of its faces, including first terminals and a first rim having a first breach therein; forming a second metal sheet carrying electrical conductive connecting parts on one of its faces, including second terminals and a second rim having a second breach therein, the said first rim, said first breach and first terminals complementing and matching the said second rim, said second breach and said second terminals, respectively; assembling the said first and second parts in matching alignment with respect to the said rims, breaches, and the said respective terminals of the said first and second parts; joining the said rims and the said terminals in electrically conductive engagement thereby providing a cavity between the said first and second metal sheets and an opening into said cavity by virtue of said breaches; introducing hardenable fluid insulation through said opening into said cavity until said cavity is filled with said fluid insulation; allowing said fluid insulation to solidify; and removing said metal sheets which thereby completes said electrical terminal board.

3. In a methods of making an electrical terminal board having mechanically formed connecting parts encompassed by an electrically conductive rim, the steps which comprise; casting a first part having a first metal sheet carrying electrically conductive connecting parts on one of its faces, including first terminals and a first rim having a first breach therein; casting a second metal sheet carrying electrical conductive connecting parts on one of its faces, including second terminals and a second rim having a second breach, the said first rim, said first breach and first terminals complementing and matching the said second rim, said second breach and said second terminals, respectively; assembling the said first and second parts in matching alignment with respect to the said rims, said breaches, and the said respective terminals of the said first and second parts; joining the said assembled first and second parts at the said respective terminals in electrically conductive engagement thereby providing a cavity between the said first and second metal sheets and an opening into said cavity by virtue of said breaches; introducing hardenable fluid insulation through said opening into said cavity until said cavity is filled with said fluid insulation; allowing said fluid insulation to solidify; and removing said metal sheets which thereby completes said electrical terminal board.

4. In a method of making an electrical terminal board having mechanically formed connecting parts encompassed by an electrically conductive rim, the steps which comprise; forming a first part having a first metal sheet carrying electrically conductive connecting parts on one of its faces, including first terminals having recesses therein of a depth equal to the length of said first terminals and a first rim having a first breach therein; forming a second metal sheet carrying electrical conductive connecting parts on one of its faces, including second terminals having recesses therein of a depth equal to the length of said second terminals and a second rim having a second breach therein, the said first rim, said first breach and first terminals complementing and matching the said second rim, said second breach and said second terminals, respectively; assembling the said first and second parts in matching alignment with respect to the said rims, breaches and the said respective terminals of the said first and second parts; joining the said assembled first and second parts at the said respective rims and the said terminals in electrically conductive engagement thereby providing a cavity between the said first and second metal sheets; and an opening into said cavity by virtue of said breaches; introducing hardenable fluid insulation through said opening into said cavity until said cavity is filled with said fluid insulation; allowing said fluid insulation to solidify; and removing said metal sheets which thereby completes said electrical terminal board.

5. In a method of making an electrical terminal board having mechanically formed connecting parts encompassed by an electrically conductive rim, the steps which comprise; coining a first part having a first metal sheet carrying electrically conductive connecting parts on one of its faces, including first terminals and a first rim having a first breach therein; coining a second metal sheet carrying electrical conductive connecting parts on one of its faces, including second terminals and a second rim having a second breach therein, the said first rim, said first breach and first terminals complementing and matching the said second rim and said second breach and said second terminals, respectively; assembling the said first and second parts in matching alignment with respect to the said rims, breaches and the said respective terminals of the said first and second parts; joining the said rims and the said terminals in electrically conductive engagement thereby providing a cavity between the said first and second metal sheets and an opening into said cavity by virtue of said breaches; introducing hardenable fluid insulation through said opening into said cavity until said cavity is filled with said fluid insulation; allowing said fluid insulation to solidify; and removing said metal sheets which thereby completes said electrical terminal board.

References Cited in the file of this patent

UNITED STATES PATENTS

| | | |
|---|---|---|
| 2,427,144 | Jansen | Sept. 9, 1947 |
| 2,502,291 | Taylor | Mar. 28, 1950 |
| 2,651,833 | Kernahan | Sept. 15, 1953 |
| 2,685,107 | Schultz | Aug. 3, 1954 |
| 2,849,699 | Demurjian | Aug. 26, 1958 |
| 2,883,447 | Dahl | Apr. 21, 1959 |
| 2,937,358 | Bulger | May 17, 1960 |
| 2,955,351 | McCreadie | Oct. 11, 1960 |

OTHER REFERENCES

IBM Technical Disclosure Bulletin "Flush Printed Circuits," E. D. Miles, volume 1, No. 2, August 1958.